July 12, 1966  H. GRÜNIG  3,260,200
CYLINDER COVER CLAMP
Filed Aug. 21, 1964
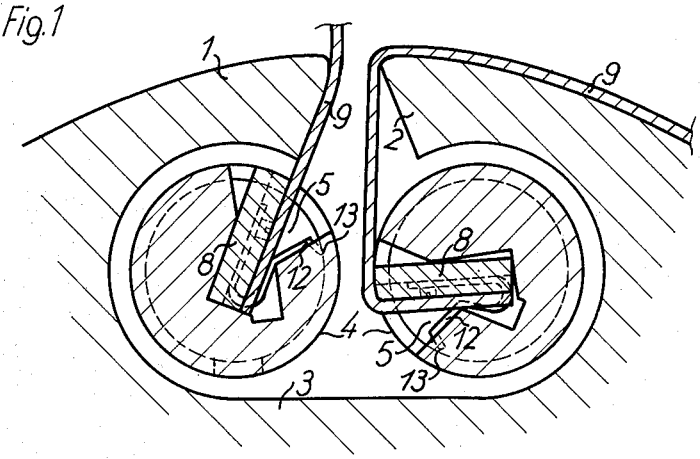
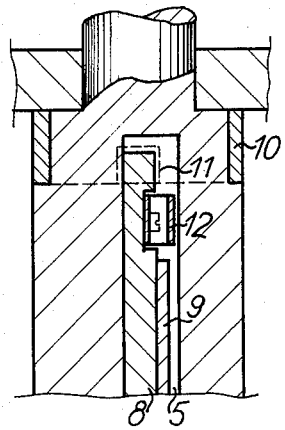
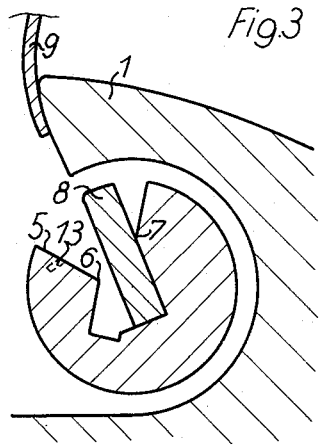
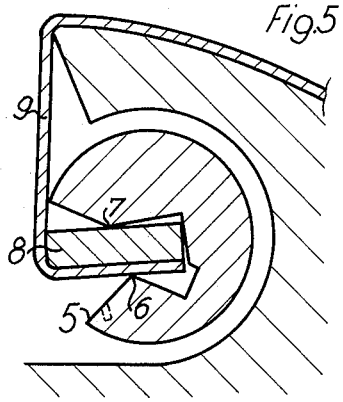
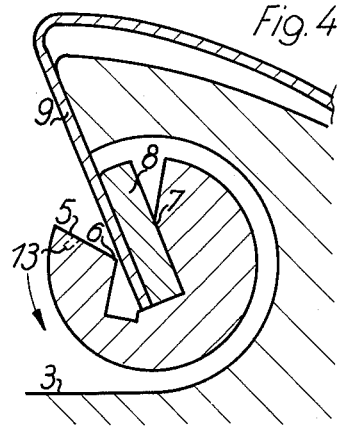
INVENTOR
HANS GRÜNIG United States Patent Office
3,260,200
Patented July 12, 1966

3,260,200
CYLINDER COVER CLAMP
Hans Grünig, Bern, Switzerland, assignor to Maschinenfabrik Winkler, Fallert & Co. A.G., Bern Switzerland
Filed Aug. 21, 1964, Ser. No. 391,125
Claims priority, application Sweden, Aug. 27, 1963, 9,329/63
8 Claims. (Cl. 101—415.1)

This invention relates to covered cylinders or rolls such as used, for example, in printing presses. More particularly, the invention is directed to novel means for securing a rubber cover in conforming surface engagement with a so-called rubber cylinder such as used, for example, in a printing press.

In arrangements of this type, it has already been suggested to form a covered cylinder with a slit extending longitudinally or axially thereof, and the walls of which diverge, uniformly or non-uniformly, radially inwardly. This slit provides for the reception of at least one clamping spindle or the like for securing a covering, such as a rubber sheet, around the surface of a cylinder. Known clamping spindles used with such cylinders are formed with longitudinal grooves, of rectangular cross section, which extend beyond the longitudinal edges of the rubber cover or sheet. Thereby, metal strips fastened to the transverse ends of the rubber cover, and extending laterally beyond the longitudinal edges of the rubber cover, can be inserted into the slots in the clamping spindles. Rotatable lock rings are provided at the outer ends of the clamping spindle to maintain the projecting metal strip ends in position.

Furthermore, for the clamping of packing or the like onto printing cylinders, it is known to use devices including a clamping spindle provided with undercut recesses into which are inserted clamping rods having bevelled edges and secured along both ends of the packing. In this case, the clamping is effected by angular displacement of the clamping spindle. Both of the above mentioned arrangements require perforation of the rubber cover or of the packing, and attachment to the metal strips or to the clamping rods. These procedures are expensive and time consuming.

For corresponding purposes, it is also known to use clamping spindles which have a generally circular cross section, but which are provided with flats extending longitudinally or axially thereof and which are arranged to have segment cross section strips superposed thereon. In such case, each segment cross section strip has one end of the rubber covering looped therearound, with lock ring being provided at both ends over the protruding strips, as the latter are positioned on the flats of the clamping spindles. These segment cross section strips, as well as the metal strips mentioned above, must be held by locking rings. Consequently, every time the rubber covering is clamped in position, is released, or is adjusted, the lock rings must be loosened or removed and again secured in position.

Another known arrangement involves a clamping spindle provided with radial recesses having an axial extent at least equal to the width of the rubber covering. These recesses are provided with prongs which, upon rotation of the clamping spindle, penetrate through the rubber covering and grip it. After repeated clamping and releasing, the rubber cover is damaged by the prongs and becomes unserviceable.

U.S. Patent No. 2,963,969, issued to Sauberlich on December 13, 1960, illustrates a clamping arrangement for tensioning printing plates, such as for tensioning steel engraved plates on printing press rollers. In the Sauberlich patent, the cylinder is provided with an axially extending groove which diverges radially inwardly and is arranged to rotatably mount a clamping cylinder. A bar or plate or the like is provided about which an end of the printing plate is bent, and this plate is inserted into a groove in engagement with a bearing surface in the wall of the groove. By rotating the clamping spindle, the latter engages the inner end of this bar and tilts and locks the same to tension the printing plate. The arrangement of the Sauberlich patent, while effective for the particular purpose for which it is intended, is inapplicable to the tensioning of a rubber cover or the like about a cylinder.

For obviating the aforementioned disadvantages of prior art arrangements, the present invention is directed to a clamping arrangement which superficially has certain features in common with the Sauberlich patent, but which has improvements thereover which contribute markedly to an efficient clamping of the ends of a rubber cover wrapped around a cylinder. Thus, in common with the Sauberlich arrangement, the present invention has a slit extending longitudinally of the cylinder and arranged to receive a rotatable clamping spindle. However, aside from this common feature, the present invention differs radically in construction, arrangement and operation, and particularly in clamping effectiveness, from the Sauberlich arrangement.

More particularly, in accordance with the present invention, the cylinder is provided with a slit or slot extending axially thereof and having wall portions which diverge radially inwardly. Inwardly of these wall portions, the slit or slot is very substantially widened to provide a pair of generally circular recesses each of which rotatably received a cylindrical cross section clamping spindle. In turn, each of these spindles is provided with a groove extending axially thereof and diverging radially inwardly thereof. This longitudinally or axially extending groove has its surfaces so designed as to provide bearing portions which are offset radially of the clamping cylinder and define a space therebetween sufficiently large that a tilting strip or bar and at least one layer of cover material, such as rubber cloth, can be inserted into the longitudinal groove in the clamping spindle. Upon a predetermined angular displacement of a clamping spindle, there is effected a relatively lateral tilting, about a longitudinal axis, of the strip or bar, and of such a nature that the strip or bar pivots about one of the bearing edges and presses the cover into firm clamping engagement with the other bearing edge, thereby not only tensioning the covering, but also firmly locking it in position. Retaining means for holding the tilting strip or bar are provided, and are so designed that the bar may remain in the longitudinal groove in the respective clamping spindle in the slot in the cylinder during clamping and releasing of the covering.

Accordingly, an object of the present invention is to provide an improved clamping arrangement for securing a covering in tight surface-to-surface engagement with the cylindrical surface of a cylinder.

Another object of the invention is to provide such a clamping arrangement in which the relative parts remain in the cylinder during insertion and releasing of the covering material.

A further object of the invention is to provide a clamping arrangement of this type including a cylindrical cross section clamping spindle rotatably mounted in the inner portion of a longitudinal slot in the cylinder to be covered and, in turn, having a longitudinal groove therein freely receiving a tiltable bar or plate, there being clearance for insertion of an end of the covering along a surface of the bar or plate, and the groove in the clamping spindle being so designed that, upon relative angular displacement of the clamping spindle about its axis, the bar or plate is tilted in such a manner as to firmly tension and grip the end of the covering in engagement therewith.

A still further object of the invention is to provide a method for tensioning a cover about a cylinder and holding the cover in firm surface-to-surface engagement with the cylindrical surface of the cylinder.

For an understanding of the principles of the invention, reference is made to the following description of a typical embodiment thereof as illustrated in the accompanying drawings.

In the drawings:

FIG. 1 is a partial transverse sectional view through a covered cylinder embodying the invention;

FIG. 2 is a partial longitudinal sectional view illustrating details of the clamping spindle and its locking mechanisms;

FIG. 3 is a partial transverse sectional view illustrating the parts in the position which they occupy at the start of introduction of a rubber covering into the clamping spindle;

FIG. 4 is a view, similar to FIG. 3, illustrating the covering after it has been inserted into the clamping spindle; and FIG. 5 is a view, similar to FIG. 3, illustrating the start of the tensioning and clamping operation.

Referring to the drawings, a covered cylinder, such as a "rubber cylinder," is illustrated at 1 as formed with a slot 2 extending longitudinally parallel to the axis of the cylinder and having wall portions diverging radially inwardly of cylinder 1. At the inner end of slot 2, there is a widened recess 3 which provides generally circular cavities for rotatably receiving clamping spindles 4 which are mounted at both ends in Schmitz rings, which latter have not been shown.

Each clamping spindle 4 is formed with a longitudinal groove 5 extending axially thereof, and having opposing surfaces providing two bearing portions 6 and 7 which are offset radially of the respective clamping spindle. A tilting strip or bar 8 is inserted into the groove 5, and the bearing or tilting edges 6 and 7 have a lateral spacing such that a rubber covering or cloth can easily be slipped in alongside the inserted tilting strip 8, which latter can be left permanently in the groove 5. In certain instances, a pad or the like is also clamped on under the rubber cloth. In such cases, this pad can be readily introduced into the groove adjacent the tilting strip or bar 8 at the same time as the rubber covering 9 is introduced.

Strip or bar 8 is longer than the width of covering 9, and, at both ends of the clamping cylinder, there are provided holding means which restrain tilting strip 8 from displacement out of groove 5 in the unclamped or released state. The holding means may comprise rotatable holding rings 10, as shown in FIG. 2, which interfit with recessed ends of the tilting strip. Rings 10 are provided with cut-outs or notches 11 which, by rotation of the holding rings, provide for removal of the tilting strip 8 from the clamping spindle 5 if necessary in an exceptional case, and without having to disassemble the clamping spindle. While such holding rings are known per se, they have hitherto been used solely to retain metal strips secured to the ends of a rubber covering, and in a clamped condition relative to a clamping spindle.

As a holding means, there may also be provided springs 12 attached to strip 8 and each having one end engaged in a groove 13 in clamping spindle 4. Springs 12 additionally may serve as holding means to bias strip 5 against that face or surface of groove 5 which is formed with tilting or bearing edge or lip 7. With such an arrangement, strip 8, in the unclamped state, will always lie in groove 5 in such a manner that introduction of the cover or the cover plus the padding, is facilitated. If rotatable holding rings are installed as the means for preventing displacement of tilting strip 8 in the unclamped state, then that end of each spring 12 which extends into groove 13 can be made shorter. In such case, the groove 13 may be eliminated and the spring may be used solely to bias the tilting strip into engagement with bearing or tilting lip 7.

The manner of the operation of the device is essentially as follows. Prior to insertion of the rubber covering, clamping spindle 4 is rotated or angularly displaced into position shown in FIG. 3. One end of covering 5 is introduced into longitudinal slot 2 of cylinder 1, and moved inwardly until the covering is inserted into groove 5 of clamping spindle 4, between strip 8 and tilting or bearing lip 6, and close to the bottom of groove 5, as illustrated in FIG. 4. Thereupon, the respective clamping spindle is turned in the direction of the arrow shown in FIG. 4 by suitable means such as, for example, a worm and worm wheel arrangement. During such rotation, the pull of the rubber covering effects tilting of the strip 8, as best seen in FIG. 5, around bearing or tilting lip 7 until strip 8 firmly presses covering material 9 against bearing lip 6. This clamping effect is amplified by continued rotation of the clamping spindle. The other end of the rubber covering, after wrapping of the rubber covering around the cylinder, is secured into the second clamping spindle 4 in the same manner.

In certain cases, it is customary to provide one end of the rubber covering with strips, and to hook these strips into a groove in the wall of the slot of the covered cylinder. The second end of the rubber covering is then gripped by means of a clamping spindle and clamped. It will be appreciated that the construction of the invention is equally suitable for devices of this type in which only one clamping spindle is provided. Furthermore, the clamping arrangement of the present invention is not limited to clamping a rubber covering on rubber cylinders, as the same arrangement can be used for clamping packing on printing cylinders.

While a specific embodiment of the invention has been shown and described in detail to illustrate the application of the principles of the invention, it will be understood that the invention may be embodied otherwise without departing from such principles.

What is claimed is:

1. Apparatus for releasably clamping a flexible covering on a cylinder comprising, in combination, a covered cylinder having a longitudinally and radially inwardly extending slot parallel to its axis, the slot having wall portions diverging radially inwardly; at least one substantially cylindrical clamping spindle mounted in said slot for angular displacement, said clamping spindle being formed with a longitudinally and radially extending groove parallel to its axis to receive an end of the flexible covering to be clamped around said covered cylinder; and a relatively elongated substantially flat tilting bar inserted in said groove with lateral clearance, said bar being tiltable laterally about a longitudinal line thereof; the wall surfaces of said groove having bearing portions cooperable with said bar and spaced laterally at a distance greater than the thickness of said bar so that an end of said flexible cover may be inserted into said groove to overlie a surface of said bar between such surface and a bearing portion of the wall surface of said groove; said barb, upon relative angular displacement of the clamping spindle, tilting laterally about one of said bearing portions to grip the end of the flexible cover engaged therewith against the other bearing surface.

2. Apparatus for clamping a flexible cover on a cylinder comprising, in combination, a covered cylinder formed with a longitudinally and radially inwardly extending slot parallel to the cylinder axis and having wall portions diverging inwardly; at least one substantially relatively elongated and substantially cylindrical clamping spindle mounted within said slot for angular displacement, said clamping spindle being formed with a radially and longitudinally extending groove parallel to its axis to receive an end of the flexible covering; and a relatively elongated and substantially flat bar inserted into said groove with clearance for reception of the end of the flexible covering in juxtaposition to a surface of said bar; the opposite surfaces of said groove each being formed with a respective bearing projection engageable with a respective surface of said bar, said bearing projections being offset radially of said groove and being spaced apart laterally a distance substantially greater than the thickness of said bar; whereby, with said bar having one surface in engagement with one of said bearing projections, the end of the flexible covering may be inserted into said groove in engagement with the opposite surface of said bar and, upon angular displacement of said clamping spindle, said bar will be tilted by the flexible covering about said one bearing projection to clamp the flexible covering between the opposite surface of said bar and the other bearing projection.

3. Apparatus for clamping a flexible cover on a cylinder comprising, in combination, a covered cylinder formed with a longitudinally and radially inwardly extending slot parallel to the cylinder axis and having wall portions diverging inwardly; at least one substantially relatively elongated and substantially cylindrical clamping spindle mounted within said slot for angular displacement, said clamping spindle being formed with a radially and longitudinally extending groove parallel to its axis to receive an end of the flexible covering; and a relatively elongated and substantially flat bar inserted into said groove with clearance for reception of the end of the flexible covering in juxtaposition to a surface of said bar; the opposite surfaces of said groove each being formed with a respective bearing projection engageable with a respective surface of said bar, said bearing projections being offset radially of said groove and being spaced apart laterally a distance substantially greater than the thickness of said bar; whereby, with said bar having one surface in engagement with one of said bearing projections, the end of the flexible covering may be inserted into said groove in engagement with the opposite surface of said bar and, upon angular displacement of said clamping spindle, said bar will be tilted by the flexible covering about said one bearing projection to clamp the flexible covering between the opposite surface of said bar and the other bearing projection; and selectively operable means for retaining said bar within said groove during clamping and releasing of the flexible cover.

4. Apparatus for clamping a flexible cover on a cylinder comprising, in combination, a covered cylinder formed with a longitudinally and radially inwardly extending slot parallel to the cylinder axis and having wall portions diverging inwardly; at least one substantially relatively elongated and substantially cylindrical clamping spindle mounted within said slot for angular displacement, said clamping spindle being formed with a radially and longitudinally extending groove parallel to its axis to receive an end of the flexible covering; and a relatively elongated and substantially flat bar inserted into said groove with clearance for reception of the end of the flexible covering in juxtaposition to a surface of said bar; the opposite surfaces of said groove each being formed with a respective bearing projection engageable with a respective surface of said bar, said bearing projections being offset radially of said groove and being spaced apart laterally a distance substantially greater than the thickness of said bar; whereby, with said bar having one surface in engagement with one of said bearing projections, the end of the flexible covering may be inserted into said groove in engagement with the opposite surface of said bar and, upon angular displacement of said clamping spindle, said bar will be tilted by the flexible covering about said one bearing projection to clamp the flexible covering between the opposite surface of said bar and the other bearing projection; and holding rings rotatably mounted on each end of said clamping spindle and interengaged with said bar for selectively retaining the same against displacement from said groove.

5. Apparatus for clamping a flexible cover on a cylinder comprising, in combination, a covered cylinder formed with a longitudinally and radially inwardly extending slot parallel to the cylinder axis and having wall portions diverging inwardly; at least one substantially relatively elongated and substantially cylindrical clamping spindle mounted within said slot for angular displacement, said clamping spindle being formed with a radially and longitudinally extending groove parallel to its axis to receive an end of the flexible covering; and a relatively elongated and substantially flat bar inserted into said groove with clearance for reception of the end of the flexible covering in juxtaposition to a surface of said bar; the opposite surfaces of said groove each being formed with a respective bearing projection engageable with a respective surface of said bar, said bearing projections being offset radially of said groove and being spaced apart laterally a distance substantially greater than the thickness of said bar; whereby, with said bar having one surface in engagement with one of said bearing projections, the end of the flexible covering may be inserted into said groove in engagement with the opposite surface of said bar and, upon angular displacement of said clamping spindle, said bar will be tilted by the flexible covering about said one bearing projection to clamp the flexible covering between the opposite surface of said bar and the other bearing projection; and spring means positioned in said groove and engageable with said bar and effective to maintain said bar releasably within said groove.

6. Apparatus for clamping a flexible cover on a cylinder comprising, in combination, a covered cylinder formed with a longitudinally and radially inwardly extending slot parallel to the cylinder axis and having wall portions diverging inwardly; at least one substantially relatively elongated and substantially cylindrical clamping spindle mounted within said slot for angular displacement, said clamping spindle being formed with a radially and longitudinally extending groove parallel to its axis to receive an end of the flexible covering; and a relatively elongated and substantially flat bar inserted into said groove with clearance for reception of the end of the flexible covering in juxtaposition to a surface of said bar; the opposite surfaces of said groove each being formed with a respective bearing projection engageable with a respective surface of said bar, said bearing projections being offset radially of said groove and being spaced apart laterally a distance substantially greater than the thickness of said bar; whereby, with said bar having one surface in engagement with one of said bearing projections, the end of the flexible covering may be inserted into said groove in engagement with the opposite surface of said bar, and, upon angular displacement of said clamping spindle, said bar will be tilted by the flexible covering about said one bearing projection to clamp the flexible covering between the opposite surface of said bar and the other bearing projection; and spring means positioned in said groove and engageable with said bar and effective to maintain said bar releasably within said groove, said clamping spindle being formed with a slot extending longitudinally thereof and each of said spring means having an end engaged in said slot.

7. Apparatus for clamping a flexible cover on a cylinder comprising, in combination, a covered cylinder formed with a longitudinally and radially inwardly extending slot parallel to the cylinder axis and having wall portions diverging inwardly; at least one susbtantially relatively elongated and substantially cylindrical clamping spindle mounted within said slot for angular displacement, said clamping spindle being formed with a radially and longitudinally extending groove parallel to its axis to receive an end of the flexible covering; and a relatively elongated and substantially flat bar inserted into said groove with clearance for reception of the end of the flexible covering in juxtaposition to a surface of said bar; the opposite surfaces of said groove each being formed with a respective bearing projection engageable with a respective surface of said bar, said bearing projections being offset radially of said groove and being spaced apart laterally a distance substantially greater than the thickness of said bar; whereby, with said bar having one surface in engagement with one of said bearing projections, the end of the flexible covering may be inserted into said groove in engagement with the opposite surface of said bar and, upon angular displacement of said clamping spindle, said bar will be tilted by the flexible covering about said one bearing projection to clamp the flexible covering between the opposite surface of said bar and the other bearing projection; and spring means positioned in said groove and engageable with said bar and effective to maintain said bar releasably within said groove, said clamping spindle being formed with a slot extending longitudinally thereof and each of said spring means having an end engaged in said slot; said bar being formed with notches engaged with said spring means.

8. The method of clamping a flexible covering around a cylinder having a longitudially and radially extending slot parallel to its axis and having wall portions diverging inwardly, said method comprising the steps of rotatably mounting, within said slot, a relatively elongated and substantially cylindrical clamping spindle formed with a radially and longitudinally extending groove to receive an end of the flexible cover, said groove having a depth at least of the order of the radius of said clamping spindle and having a bearing portion extending longitudinally of at least one surface of said groove; positioning, within said groove, a relatively elongated and substantially flat clamping bar having a width of the order of the depth of said groove and a thickness sufficiently less than the minimum width of said groove to provide clearance for insertion of an end of the flexible cover into said groove in engagement with a surface of said bar, for tilting of said bar, in a direction perpendicular to its longitudinal extent, about said bearing portion; inserting an end of the flexible cover into said groove so as to overlie a substantially flat surface of said bar; and rotating the clamping spindle to tilt said bar about said bearing portion to clamp the inserted end of the flexible covering between such substantially flat surface of the bar and a surface of said groove.

References Cited by the Examiner

UNITED STATES PATENTS

| 1,949,132 | 2/1934 | Smith | 101—415.1 |
| 2,729,164 | 1/1956 | Stempel | 101—415.1 |
| 2,850,970 | 9/1958 | Brodie | 101—415.1 |
| 2,963,969 | 12/1960 | Sauberlich | 101—415.1 |

FOREIGN PATENTS 617,763  4/1961  Canada.

WILLIAM FELDMAN, *Primary Examiner.*

D. GRIFFIN, *Assistant Examiner.*